(12) United States Patent
Yamane

(10) Patent No.: US 7,861,755 B2
(45) Date of Patent: Jan. 4, 2011

(54) PNEUMATIC TIRE WITH TREAD HAVING MIDDLE RIB, MIDDLE LATERAL GROOVES, ASSISTANT GROOVES AND LATERAL NARROW GROOVES

(75) Inventor: Kenji Yamane, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 914 days.

(21) Appl. No.: 11/667,159

(22) PCT Filed: Nov. 28, 2005

(86) PCT No.: PCT/JP2005/021777

§ 371 (c)(1),
(2), (4) Date: May 4, 2007

(87) PCT Pub. No.: WO2006/059560

PCT Pub. Date: Jun. 8, 2006

(65) Prior Publication Data

US 2008/0035256 A1     Feb. 14, 2008

(30) Foreign Application Priority Data

Nov. 30, 2004  (JP) ............................. 2004-346258

(51) Int. Cl.
 B60C 11/04   (2006.01)
 B60C 11/12   (2006.01)
(52) U.S. Cl. .............. 152/209.18; 152/901; 152/DIG. 3
(58) Field of Classification Search ............ 152/209.18, 152/209.28, 901, DIG. 3
See application file for complete search history.

(56) References Cited

U.S. PATENT DOCUMENTS 5,423,364 A * 6/1995 Himuro ................. 152/209.18

(Continued)

FOREIGN PATENT DOCUMENTS

JP          64-036506     *  2/1989

(Continued)

OTHER PUBLICATIONS

Machine translation for Japan 2003-011616 (no date).*

(Continued)

*Primary Examiner*—Steven D Maki
(74) *Attorney, Agent, or Firm*—Greer, Burns & Crain, Ltd

(57) ABSTRACT

A pneumatic tire includes a tread surface having a middle rib defined by a first circumferential groove and a second circumferential groove in its center region. Middle lateral grooves, that obliquely extend in the widthwise direction of the tire, are disposed at predetermined intervals in the tire circumferential direction in the middle rib; only one terminal end of each middle lateral groove communicates with one circumferential groove of the first and second circumferential grooves. An assistant groove is provided between each of adjacent middle lateral grooves; the assistant groove extends in such an inclined manner that the inclination direction thereof with respect to the tire circumferential direction is opposite to that of the middle lateral grooves; a block is defined by the assistant groove, middle lateral grooves and one circumferential groove. The middle lateral grooves each include a first inclined groove portion having an inclination angle a ranging from 35 degrees to 60 degrees and a second inclined groove portion having an inclination angle β ranging from 0 degree to 30 degrees.

13 Claims, 1 Drawing Sheet

U.S. PATENT DOCUMENTS

| | | | |
|---|---|---|---|
| 6,371,180 B1 * | 4/2002 | Hayashi | 152/209.28 |
| 2003/0094226 A1 * | 5/2003 | Colombo et al. | 152/209.18 |
| 2006/0137791 A1 * | 6/2006 | Miyabe et al. | 152/209.18 |

FOREIGN PATENT DOCUMENTS

| | | | |
|---|---|---|---|
| JP | 05-301508 | * | 11/1993 |
| JP | 6-40215 | | 2/1994 |
| JP | 06-048117 | * | 2/1994 |
| JP | 2000-135904 | | 5/2000 |
| JP | 2000-229506 | | 8/2000 |
| JP | 2003-11616 | | 1/2003 |
| JP | 2003-011616 | * | 1/2003 |
| JP | 2004-17863 | | 1/2004 |
| JP | 2004-262312 | | 9/2004 |

OTHER PUBLICATIONS

Machine translation for Japan 06-048117 (no date).*
Machine translation for Japan 05-301508 (no date).*

* cited by examiner

PNEUMATIC TIRE WITH TREAD HAVING MIDDLE RIB, MIDDLE LATERAL GROOVES, ASSISTANT GROOVES AND LATERAL NARROW GROOVES

TECHNICAL FIELD

The present invention relates to pneumatic tires, and more particularly, to a pneumatic tire adapted especially for passenger cars, which can improve uneven wear while maintaining drainage characteristics.

TECHNICAL BACKGROUND

Conventionally, there are pneumatic tires, in particular pneumatic passenger tires, including a tread surface having lateral grooves provided in its center region at predetermined intervals in the circumferential direction of the tires in order to enhance an effect of cutting water screen on road surfaces and removing it, the lateral grooves being inclined at a relatively small angle of, for example, about 10 to 45 degrees with respect to the tire circumferential direction. One of such pneumatic tires is arranged such that the inclined lateral grooves communicate at one ends with one circumferential groove and does not communicate at the other ends with another circumferential groove, the other ends being located within a rib.

This pneumatic tire can effectively drain water that has flowed into the lateral grooves by cutting water screen on road surfaces from the one ends of the lateral grooves to the one circumferential groove communicating therewith; however, since the other ends of the lateral grooves does not communicate with the another circumferential groove, the water flowed thereinto by cutting the water screen can not effectively be drained to the another circumferential groove; as a result, drainage characteristics have to be lowered.

To solve the above problem, there has been proposed a pneumatic tire having assistant grooves that extend from the center regions of the lateral grooves and communicate with the another circumferential groove (see Japanese Patent Application Kokai Publication No. 2004-17863, for example). The water flowing toward the other end side within the lateral grooves is drained through the assistant grooves, thereby improving drainage characteristics.

However, blocks that are small in contact area are defined by the another circumferential groove, lateral grooves, and assistant grooves adjacent the another circumferential groove; therefore, tread rigidity is locally lowered in the region where the blocks exist, thereby suffering from a problem in that the tread is subject to uneven wear.

DISCLOSURE OF THE INVENTION

An object of the present invention is to provide a pneumatic tire having assistant grooves to enhance drainage characteristics in which uneven wear can be reduced, maintaining drainage characteristics.

In order to achieve the above object, a pneumatic tire according to present invention includes a tread surface having a center region, the tread surface comprising: a first circumferential groove extending in a circumferential direction of the tire in the center region; a second circumferential groove extending in the circumferential direction of the tire in the center region; a middle rib defined by the first circumferential groove and the second circumferential groove; middle lateral grooves obliquely extending in a widthwise direction of the tire and disposed at predetermined intervals in the circumferential direction of the tire in the middle rib, only one terminal end of each of the middle lateral grooves communicating with one circumferential groove of the first circumferential groove and second circumferential groove; an assistant groove provided between each of adjacent middle lateral grooves, the assistant groove extending in such an inclined manner that an inclination direction thereof with respect to the circumferential direction of the tire is opposite to that of the middle lateral grooves; and a block defined by the assistant groove, middle lateral grooves and one circumferential groove, wherein: the middle lateral grooves each include a first inclined groove portion communicating with the one circumferential groove and a second inclined groove portion connected to the first inclined groove portion, the first inclined groove portion having an inclination angle a ranging from 35 degrees to 60 degrees with respect to the circumferential direction of the tire, the second inclined groove portion having an inclination angle β ranging from 0 degree to 30 degrees with respect to the circumferential direction of the tire; and the assistant groove has opposing terminal ends that communicate with the adjacent middle lateral grooves, one terminal end of the opposing terminal ends of the assistant groove being located at a position ranging from 20% to 30% of a tire-widthwise length of one middle lateral groove of the adjacent middle lateral grooves from the one terminal end of the one middle lateral groove toward a side of the other terminal end of the one middle lateral groove in the widthwise direction of the tire, the other terminal end of the opposing terminal ends of the assistant groove being located at a position ranging from 20% to 30% of a tire-widthwise length of the other middle lateral groove of the adjacent middle lateral grooves from the other terminal end of the other middle lateral groove toward a side of the one terminal end of the other middle lateral groove in the widthwise direction of the tire.

According to the present invention, the assistant grooves obliquely disposed between the middle lateral grooves communicate with the middle lateral grooves at positions described above, whereby the blocks defined by the one circumferential groove, middle lateral grooves, and assistant grooves become larger than before, which can make the rigidity of the blocks higher. Therefore, conventionally problematic uneven wear due to the blocks can be suppressed, improving uneven wear resistance.

In addition to the structure having the assistant grooves that communicate with the middle lateral grooves as described above, the middle lateral grooves each comprise a first inclined groove portion communicating with the one circumferential groove and a second inclined groove portion connected thereto, and the inclination angles a and B thereof are specified in the above ranges, whereby drainage characteristics can be maintained at the same level as those of the prior art.

BEST MODES FOR CARRYING OUT THE INVENTION

Figure 1:
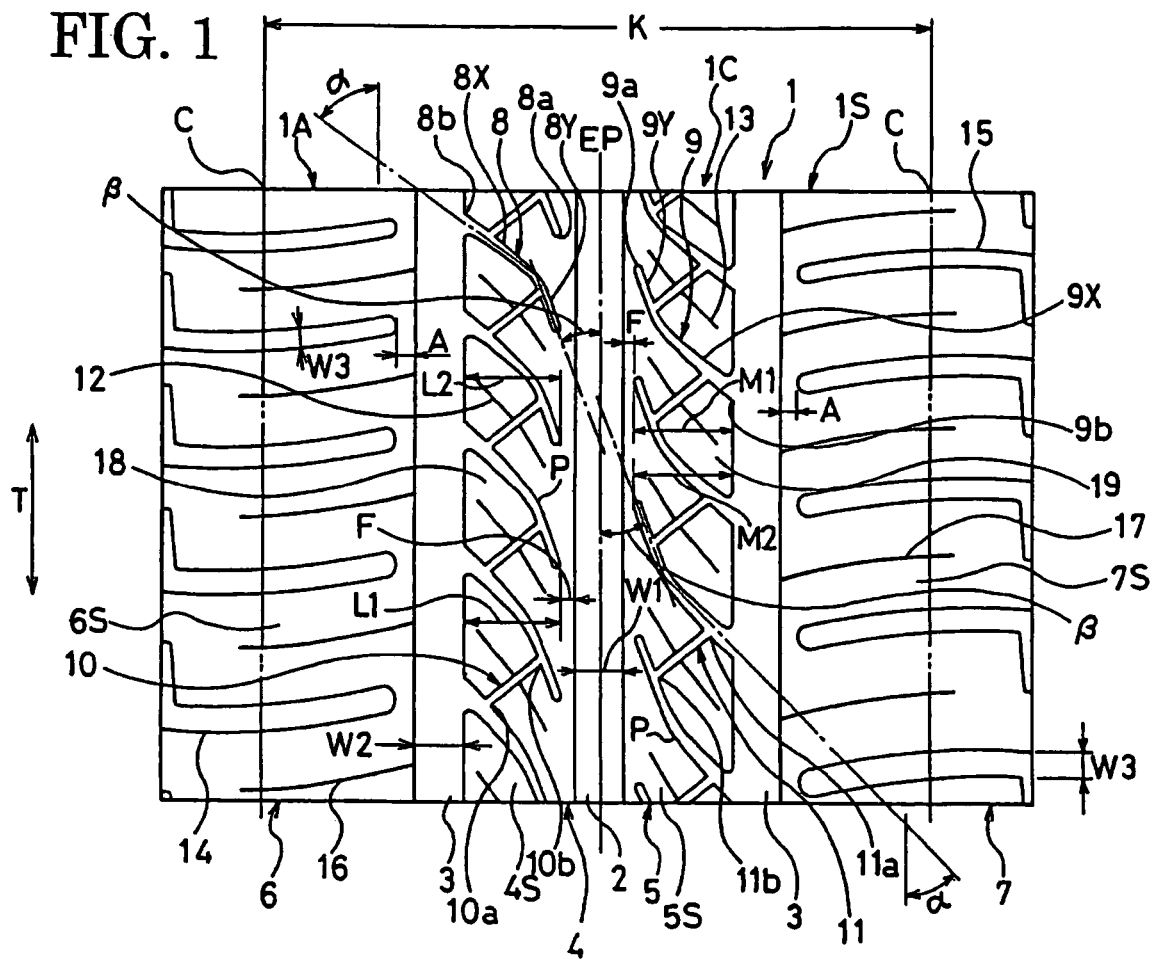
FIG. 1 is a partial development view of a tread surface showing an embodiment of a pneumatic tire according to the present invention.

An embodiment of the present invention will be described in detail below with reference to the attached drawing.

Referring to FIG. 1, there is shown an embodiment of a pneumatic tire according to the present invention; reference numeral 1 denotes a tread surface. The tread surface 1 has a plurality of circumferential grooves that extend in the circumferential direction T of the tire. These plurality of circumferential grooves comprise a first circumferential groove 2 located at the equatorial plane EP of the tire, and two second circumferential grooves 3 disposed on both sides of the tire equatorial plane EP away a prescribed interval (substantially equidistantly) from the tire equatorial plane. Middle ribs 4 and 5 that annularly extend in the tire circumferential direction T are formed between the first circumferential groove 2 and the second circumferential grooves 3 and 3 in the center region 1C of the tread surface 1. Outer ribs 6 and 7 that annularly extend in the tire circumferential direction T are formed in the shoulder regions 1S of the tread surface 1 located tire-widthwisely outwardly of the second circumferential grooves 3 and 3.

The middle ribs 4 and 5 include contact faces (portions of the tread surface) 4S and 5S, which have middle lateral grooves 8 and 9 that extend tire-widthwisely inwardly from the second circumferential grooves 3 and 3 and are disposed at prescribed intervals in the tire circumferential direction T. The middle lateral grooves 8 provided in the middle rib 4 obliquely extend from one of the second circumferential grooves 3 toward one side of the tire circumferential direction (downside in the drawing) to the vicinity of the first circumferential groove 2, and each have an inner terminal end 8a that does not communicate with the first circumferential groove 2 but is located within the middle rib 4. The middle lateral grooves 9 provided in the middle rib 5 obliquely extend from the other of the second circumferential grooves 3 toward the other side of the tire circumferential direction (upside in the drawing) to the vicinity of the first circumferential groove 2, and each have an inner terminal end 9a that does not communicate with the first circumferential groove 2 but is located within the middle rib 5.

The middle lateral grooves 8 and 9 have outer terminal ends 8b and 9b that communicate with the second circumferential grooves 3 and 3, and are gradually greater in width from the inner terminal ends 8a and 9a toward the outer terminal ends 8b and 9b. The middle lateral grooves 8 and 9 include first inclined groove portions 8X and 9X that communicate with the second circumferential grooves 3 and 3, and second inclined groove portions 8Y and 9Y connected thereto; the first inclined groove portions 8X and 9X which extend straight are connected to the second inclined groove portions 8Y and 9Y which extend straight in a bending manner.

The first inclined groove portions 8X and 9X each have an inclination angle a ranging from 35 degrees to 60 degrees with respect to the tire circumferential direction T. The second inclined groove portions 8Y and 9Y each have an inclination angle β ranging from 0 degree to 30 degrees with respect to the tire circumferential direction T.

There is provided between each of adjacent middle lateral grooves 8 and 8 an assistant groove 10 extending in such an inclined manner that its inclination direction with respect to the tire circumferential direction T is opposite to that of the middle lateral grooves 8. The assistant groove 10 has one terminal end 10a that communicates with the first inclined groove portion 8X of one (lower middle lateral groove in the drawing) of the adjacent middle lateral grooves 8 and 8, and the other terminal end 10b that communicates with the second inclined groove portion 8Y of the other (upper middle lateral groove in the drawing) of the adjacent middle lateral grooves 8 and 8. A block 18 is defined by the assistant groove 10, the middle lateral grooves 8 and 8, and the one second circumferential groove 3 in the middle rib 4.

The inner terminal end 10a of the assistant groove 10 is, if L1 (mm) is the tire widthwise length (length measured in parallel to the tire axis) of the one middle lateral groove 8 with which the inner terminal end communicates, located in the range from 0.2L1 to 0.3L1 (20 to 30% of the tire widthwise length L1) from the outer terminal end 8b toward the inner terminal end 8a side of the one middle lateral groove 8 in the tire widthwise direction (tire axis direction). The outer terminal end 10b of the assistant groove 10 is, if L2 (mm) is the tire widthwise length (length measured in parallel to the tire axis) of the other middle lateral groove 8 with which the outer terminal end communicates, located in the range from 0.2L2 to 0.3L2 (20 to 30% of the tire widthwise length L2) from the inner terminal end 8a toward the outer terminal end 8b side of the other middle lateral groove 8 in the tire widthwise direction.

There is also provided between each of adjacent middle lateral grooves 9 and 9 an assistant groove 11 extending in such an inclined manner that its inclination direction with respect to the tire circumferential direction T is opposite to that of the middle lateral grooves 9. The assistant groove 11 has one terminal end 11a that communicates with the first inclined groove portion 9X of one (upper middle lateral groove in the drawing) of the adjacent middle lateral grooves 9 and 9, and the other terminal end 11b that communicates with the second inclined groove portion 9Y of the other (lower middle lateral groove in the drawing) of the adjacent middle lateral grooves 9 and 9. A block 19 is defined by the assistant groove 11, the middle lateral grooves 9 and 9, and the other second circumferential groove 3 in the middle rib 5.

The inner terminal end 11a of the assistant groove 11 is, if M1 (mm) is the tire widthwise length (length measured in parallel to the tire axis) of the one middle lateral groove 9 with which the inner terminal end communicates, located in the range from 0.2M1 to 0.3M1 (20 to 30% of the tire widthwise length M1) from the outer terminal end 9b toward the inner terminal end 9a side of the one middle lateral groove 9 in the tire widthwise direction. The outer terminal end 11b of the assistant groove 11 is, if M2 (mm) is the tire widthwise length (length measured in parallel to the tire axis) of the other middle lateral groove 9 with which the outer terminal end communicates, located in the range from 0.2M2 to 0.3M2 (20 to 30% of the tire widthwise length M2) from the inner terminal end 9a toward the outer terminal end 9b side of the other middle lateral groove 9 in the tire widthwise direction.

There is provided between each of adjacent middle lateral grooves 8 and 8 a middle narrow groove 12 that is smaller in width than the middle lateral grooves 8 and tire-widthwisely extend in such an inclined manner that its inclination direction is the same as that of the middle lateral grooves 8; the middle narrow grooves 12 and the middle lateral grooves 8 are alternately disposed in the tire circumferential direction T in the rib 4. The middle narrow groove 12 has opposing terminal ends that are located within the middle rib 4 and do not communicate with the first circumferential groove 2 and the one second circumferential groove 3.

There is also provided between each of adjacent middle lateral grooves 9 and 9 a middle narrow groove 13 that is smaller in width than the middle lateral grooves 9 and tire-widthwisely extend in such an inclined manner that its inclination direction is the same as that of the middle lateral grooves 9; the middle narrow grooves 13 and the middle lateral grooves 9 are alternately disposed in the tire circumferential direction T in the rib 5. Each middle narrow groove 13 has opposing terminal ends that are located within the middle rib 5 and do not communicate with the first circumferential groove 2 and the other second circumferential groove 3.

As described above, the middle lateral grooves 8 and 9 and the middle narrow grooves 12 and 13 are alternately placed in the middle ribs 4 and 5, thereby dispersing the frequency of noise due to the middle lateral grooves 8 and 9 to reduce noise. There is no particular limitation to the widths of the middle narrow grooves 12 and 13 if they are smaller in width than the middle lateral grooves 8 and 9; for example, grooves having widths of about 0.5 to 3.0 mm are preferably used therefor.

The outer ribs 6 and 7 include contact faces (portions of the tread surface) 6S and 7S, which have tire-widthwisely extending outer lateral grooves 14 and 15 that are disposed at prescribed intervals in the tire circumferential direction T. The outer lateral grooves 14 provided in the outer rib 6 extend tire-widthwisely outwardly from positions away from the one second circumferential groove 3 beyond one of the contact ends C of the tire in a slightly inclined manner toward the one side of the tire circumferential direction (downside in the drawing). The outer lateral grooves 15 provided in the outer rib 7 extend tire-widthwisely outwardly from positions away from the other second circumferential groove 3 beyond the other of the contact ends C of the tire in a slightly inclined manner toward the other side of the tire circumferential direction (upside in the drawing).

There is provided between each of adjacent outer lateral grooves 14 and 14 an outer narrow groove 16 that is smaller in width than the outer lateral grooves 14 and tire-widthwisely extend in such an inclined manner that its inclination direction is the same as that of the outer lateral grooves 14; the outer narrow grooves 16 and the outer lateral grooves 14 are alternately disposed in the tire circumferential direction T in the rib 6. Each outer narrow groove 16 extends tire-widthwisely outwardly from the one second circumferential groove 3 beyond the one contact end C.

There is also provided between each of adjacent outer lateral grooves 15 and 15 an outer narrow groove 17 that is smaller in width than the outer lateral grooves 15 and tire-widthwisely extend in such an inclined manner that its inclination direction is the same as that of the outer lateral grooves 15; the outer narrow grooves 17 and the outer lateral grooves 15 are alternately disposed in the tire circumferential direction T in the rib 7. Each outer narrow groove 17 extends tire-widthwisely outwardly from the other second circumferential groove 3 beyond the other contact end C.

As described above, the outer lateral grooves 14 and 15 and the outer narrow grooves 16 and 17 are alternately placed in the outer ribs 6 and 7, thereby dispersing the frequency of noise due to the outer lateral grooves 14 and 15 to reduce noise. There is also no particular limitation to the widths of the outer narrow grooves 16 and 17 if they are smaller in width than the outer lateral grooves 14 and 15; grooves having widths of about 0.5 to 3.0 mm are preferably used therefore as the above middle narrow grooves 12 and 13.

According to the present invention, the assistant grooves 10 and 11 that are obliquely disposed between each of adjacent middle lateral grooves 8 and 8, and between each of adjacent middle lateral grooves 9 and 9 communicate with the middle lateral grooves 8 and 9 at the communicating positions described above, whereby the blocks 18 and 19 defined by the second circumferential grooves 3 and 3, middle lateral grooves 8 and 9, and assistant grooves 10 and 11 become larger than before, which can make the rigidity of the blocks higher; therefore, uneven wear due to the blocks 18 and 19 can be suppressed, improving uneven wear resistance.

In addition to the structure that makes the assistant grooves 10 and 11 communicate with the middle lateral grooves 8 and 9 as described above, the inclination angles a and β of the first inclined groove portions 8X and 9X and the second inclined groove portions 8Y and 9Y constituting the middle lateral grooves 8 and 9 are specified in the above ranges, whereby drainage characteristics can be maintained at the same level as those of the prior art.

If the one terminal ends 10a and 11a of the assistant grooves 10 and 11 communicate with the first inclined groove portions 8X and 9X of the middle lateral grooves 8 and 9 at positions that are located nearer to the outer terminal ends 8b and 9b sides of the middle lateral grooves 8 and 9 than the positions of 0.2L1 and 0.2M1 from the outer terminal ends 8b and 9b of the middle lateral grooves 8 and 9, it is difficult to effectively suppress uneven wear due to the blocks 18 and 19. If the one terminal ends 10a and 11a of the assistant grooves 10 and 11 communicate with the first inclined groove portions 8X and 9X of the middle lateral grooves 8 and 9 at positions that are beyond the positions of 0.3L1 and 0.3M1 from the outer terminal ends 8b and 9b of the middle lateral grooves 8 and 9, the distances of the one terminal ends 10a and 11a away from the second circumferential grooves 3 are so long that drainage characteristics are lowered.

If the other terminal ends 10b and 11b of the assistant grooves 10 and 11 communicate with the second inclined groove portions 8Y and 9Y of the middle lateral grooves 8 and 9 at positions that are located nearer to the inner terminal ends 8a and 9a sides of the middle lateral grooves 8 and 9 than the positions of 0.2L2 and 0.2M2 from the inner terminal ends 8a and 9a of the middle lateral grooves 8 and 9, the inclination angles of the assistant grooves 10 and 11 with respect to the tire circumferential direction T are so great that drainage characteristics decrease. If the other terminal ends 10b and 11b of the assistant grooves 10 and 11 communicate with the second inclined groove portions 8Y and 9Y of the middle lateral grooves 8 and 9 at positions that are beyond the positions of 0.3L2 and 0.3M2 from the inner terminal ends 8b and 9b of the middle lateral grooves 8 and 9, it is difficult to effectively suppress uneven wear due to the blocks 18 and 19.

If the inclination angles a of the first inclined groove portions 8X and 9X with respect to the tire circumferential direction T are less than 35 degrees, the blocks 18 and 19 each have a corner inclined greatly with respect to the tire circumferential direction T, resulting in a decrease in block rigidity, whereby it is difficult to suppress uneven wear. If the inclination angles a are beyond 60 degrees, it is difficult to maintain drainage characteristics at the prior art level. The inclination angles a are preferably equal to or greater than 45 degrees in the case of emphasis on uneven wear resistance, and is preferably equal to or less than 50 degrees in the case of emphasis on drainage characteristics.

If the inclination angles β of the second inclined groove portions 8Y and 9Y with respect to the tire circumferential direction T are less than 0 degree (inclined in an opposite direction with respect to the tire circumferential direction T), it is difficult to maintain drainage characteristics at the prior art level. If the inclination angles β exceed 30 degrees also, it is difficult to maintain drainage characteristics at the prior art level. The inclination angles β are preferably equal to or less than 15 degrees, more preferably equal to or less than 10 degrees in the case of emphasis on drainage characteristics, and is preferably equal to or greater than 15 degrees, more preferably equal to or greater than 20 degrees in the case of emphasis on uneven wear resistance.

In the present invention, there is no particular limitation to the widths of the assistant grooves 10 and 11, which is suitably adjusted according to tire types; in general, pneumatic tires for passenger cars are preferably arranged such that it ranges from 1.0 mm to 4.0 mm. If the widths of the assistant grooves 10 and 11 are less than 1.0 mm, it is difficult to obtain good drainage characteristics; if the widths of the assistant grooves 10 and 11 are greater than 4.0 mm, it is difficult to maintain good uneven wear resistance.

The connecting positions P of the first inclined groove portions 8X and 9X and the second inclined groove portions 8Y and 9Y are preferably in the range of about 40% to about 60% of the tire widthwise lengths of the middle lateral grooves 8 and 9 from the outer terminal ends 8b and 9b of the middle lateral grooves 8 and 9.

The second circumferential grooves 3 and 3 each preferably have a width W2 that is substantially one to three times greater than the width W1 of the first circumferential groove 2. If the width W2 of each of the second circumferential grooves 3 and 3 is smaller than the width W1 of the first circumferential groove 2, it is not preferably because of a bad affection on drainage characteristics. If the width W2 of each of the second circumferential grooves 3 and 3 is greater than three times the width W1 of the first circumferential groove 2, a portion in which tread rigidity is locally lowered is apt to occur, causing uneven wear.

The sum of the widths W1 and W2 of the first circumferential groove 2 and second circumferential grooves 3 and 3 preferably ranges from 20% to 35% of the contact width K of the tire. The sum of the widths W1 and W2 that is less than 20% of the tire contact width K badly affects on drainage characteristics. The sum of the widths W1 and W2 that is greater than 35% of the tire contact width K causes a decrease in the contact area of the tread surface 1, degrading driving stability.

The middle lateral grooves 8 and 9 each preferably have a width ranging from 1.0 mm to 6.0 mm; the width may be constant or varied within the range.

The distance (length measured in parallel to the tire axis) F (mm) between the first circumferential groove 2 and each of the inner terminal ends 8a and 9a of the middle lateral grooves 8 and 9 away therefrom preferably ranges from 20% to 40% of the width W1 of the first circumferential groove 2 (circumferential groove on the side away therefrom) in terms of drainage and noise characteristics.

The outer lateral grooves 14 and 15 each preferably have a width W3 ranging from 30% to 60% of the widths W2 of the second circumferential grooves 3 and 3. In general, if a lateral groove has a large width, drainage characteristics are improved, but noise due to the groove increases. Since the outer lateral grooves 14 and 15 are arranged not to communicate with the second circumferential grooves 3 and 3 so that they are short in length, an increase in noise due to the grooves can be prevented even if the widths of the lateral grooves 14 and 15 are made large up to 60% as described above. If the widths W3 of the outer lateral grooves 14 and 15 are less than 30% of the widths W2 of the second circumferential grooves 3, drainage characteristics decrease in the shoulder regions 1S of the tread surface 1. If the widths W3 of the outer lateral grooves 14 and 15 are greater than 60% of the widths W2 of the second circumferential grooves 3, noise due to the outer lateral grooves 14 and 15 is deteriorated.

The distances (lengths measured in parallel to the tire axis) A (mm) between the second circumferential grooves 3 and 3 and the outer lateral grooves 14 and 15 away therefrom are preferably from 20% to 50% of the widths W2 of the second circumferential grooves 3 and 3. If the distances A are less than 20% of the widths W2 of the second circumferential grooves 3 and 3, noise due to the outer lateral grooves 14 and 15 is deteriorated because the outer lateral grooves 14 and 15 become longer accordingly. If the distances A are greater than 50% of the widths W2 of the second circumferential grooves 3 and 3, drainage characteristics are lowered in the shoulder regions 1S because the outer lateral grooves 14 and 15 become shorter accordingly.

In the above embodiment of the present invention, the middle lateral grooves 8 and 9 extend tire-widthwisely inwardly from the second circumferential grooves 3 and 3; however, the middle lateral grooves 8 and 9 may extend tire-widthwisely outwardly from the first circumferential groove 2; the middle lateral grooves 8 and 9 may be arranged such that only one ends thereof communicate with any of the first circumferential groove 2 and second circumferential grooves 3.

The above-described embodiment shows an example where one first circumferential groove 2 is provided at the equatorial plane EP of the tire; however, the pneumatic tire of the present invention may be one in which two first circumferential grooves 2 and 2 are provided on both sides of the equatorial plane EP of the tire, and the above middle ribs 4 and 5 are disposed between the two circumferential grooves 2 and 2 and second circumferential grooves 3 and 3 located outwardly thereof.

The first inclined groove portions 8X and 9X and second inclined groove portions 8Y and 9Y of the middle lateral grooves 8 and 9 may be arranged so as to extend in curved lines such that the inclination angles a and β are gradually greater toward the outer terminal ends 8b and 9b of the middle lateral grooves 8 and 9 instead of extending in straight lines.

The tread pattern shown in FIG. 1 is a non-directional tread pattern in which the grooves are symmetrically disposed with respect to a point at the equatorial plane EP of the tire, but may be a directional tread pattern in which the grooves are symmetrically disposed with respect to a line at the plane EP of the tire, for example.

The present invention is preferably used for pneumatic tires for passenger cars in particular. In the case of pneumatic passenger tires, the tire contact width K described above is the maximum contact width of the tread surface when measured as follows: the tire is mounted on a standard rim specified in JATMA (year 2004 edition); an air pressure of 180 kPa is applied thereto; and the maximum contact width is measured under load of 75% of the load capacity corresponding to the air pressure of 180 kPa, specified in JATMA (year 2004 edition).

EXAMPLE 1

Prepared were test tires according to the present invention tires 1 to 3, comparison tires 1 and 2, and conventional tire, each having a tire size of 195/65R15 and a tread pattern shown in FIG. 1, in which the inclination angles a and β of the first and second inclined groove portions of each middle lateral groove, the communicating position (from the outer terminal end of the one middle lateral groove) of one terminal end and communicating position (from the inner terminal end of the other middle lateral groove) of the other terminal end of each assistant groove communicating with the middle lateral grooves were as shown in Table 1.

The test tires are the same in construction except for the structures shown in Table 1, and are as shown in the following.

Width of First Circumferential Groove: 11 mm
Width of Second Circumferential Groove: 11 mm
Sum of Widths of First and Second Circumferential Grooves: 24% of the tire contact width K
Connecting Position of First and Second Inclined Groove Portions: 40% of the tire-widthwise length of the middle lateral groove
Width of Middle Lateral Groove: vary gradually within the range of 1.3 mm to 3.5 mm
Length F between First Circumferential Groove and Inner Terminal End of Middle Lateral Groove away therefrom: 3.5 mm
Width of Outer Lateral Groove: 4 mm
Length A between Second Circumferential Groove and Outer Lateral Groove away therefrom: 4 mm
Width of Assistant Groove: 1.5 mm
Evaluation testing for drainage characteristics and uneven wear resistance was carried out on the test tires according to the following test methods, obtaining the results shown in Table 1.

Drainage Characteristics

The test tires were seated on 15×6 sized rims, inflated to an air pressure of 180 kPa, and mounted on a passenger car of 2000 cc displacement. The maximum lateral acceleration was measured when the car was run drawing a circle having a radius of 100 m. The evaluation results of the measurement values were represented by an index where the conventional tire was 100. As the index value is greater, drainage characteristics are better.

Uneven Wear Resistance

The test tires were mounted on a passenger car of 2000 cc displacement as in the above testing. After the car was run for 8000 km on a public road, the state of uneven wear created in the tread surface was visually observed and evaluated. The evaluation results were represented by an index where the conventional tire was 100. As the index value is greater, uneven wear resistance is better.

TABLE 1

|  | Conventional Tire | Comparison Tire 1 | Present Invention Tire 1 | Present Invention Tire 2 | Present Invention Tire 3 | Comparison Tire 2 |
|---|---|---|---|---|---|---|
| Inclination Angle a (°) | 40 | 25 | 35 | 50 | 60 | 70 |
| Inclination Angle β (°) | 15 | 15 | 15 | 15 | 15 | 15 |
| Communicating Position of One Terminal End of Assistant Groove | 0% | 25% | 25% | 25% | 25% | 25% |
| Communicating Position of the Other Terminal End of Assistant Groove | 50% | 25% | 25% | 25% | 25% | 25% |
| Drainage Characteristics | 100 | 102 | 106 | 103 | 100 | 97 |
| Uneven Wear Resistance | 100 | 97 | 103 | 105 | 105 | 103 |

As can be seen from Table 1, the present invention tires in which the inclination angles a of the first inclined groove portions of the middle lateral grooves range from 35 degrees to 60 degrees can improve uneven wear resistance while maintaining drainage characteristics.

EXAMPLE 2

Prepared were test tires according to the present invention tires 4 to 6 and comparison tires 3 and 4, each having the same tire size and tread pattern as in Example 1, in which the inclination angles a and β of the first and second inclined groove portions of each middle lateral groove, the communicating position (from the outer terminal end of the one middle lateral groove) of one terminal end and communicating position (from the inner terminal end of the other middle lateral groove) of the other terminal end of each assistant groove communicating with the middle lateral grooves were as shown in Table 2. The test tires are the same in construction as in Example 1 except for the structures shown in Table 2.

Evaluation testing for drainage characteristics and uneven wear resistance was carried out on the test tires according to the test methods shown in Example 1, obtaining the results shown in Table 2.

TABLE 2

|  | Comparison Tire 3 | Present Invention Tire 4 | Present Invention Tire 5 | Present Invention Tire 6 | Comparison Tire 4 |
|---|---|---|---|---|---|
| Inclination Angle a (°) | 50 | 50 | 50 | 50 | 50 |
| Inclination Angle β (°) | −10 | 0 | 15 | 30 | 40 |
| Communicating Position of One Terminal End of Assistant Groove | 25% | 25% | 25% | 25% | 25% |
| Communicating Position of the Other Terminal End of Assistant Groove | 25% | 25% | 25% | 25% | 25% |
| Drainage Characteristics | 97 | 106 | 103 | 100 | 95 |
| Uneven Wear Resistance | 102 | 103 | 105 | 106 | 105 |

As can be seen from Table 2, the present invention tires in which the inclination angles B of the second inclined groove portions of the middle lateral grooves range from 0 degree to 30 degrees can improve uneven wear resistance while maintaining drainage characteristics.

EXAMPLE 3

Prepared were test tires according to the present invention tires 7 to 9 and comparison tires 5 and 6, each having the same tire size and tread pattern as in Example 1, in which the inclination angles a and β of the first and second inclined groove portions of each middle lateral groove, the communicating position (from the outer terminal end of the one middle lateral groove) of one terminal end and communicating position (from the inner terminal end of the other middle lateral groove) of the other terminal end of each assistant groove communicating with the middle lateral grooves were as shown in Table 3. The test tires are the same in construction as in Example 1 except for the structures shown in Table 3.

Evaluation testing for drainage characteristics and uneven wear resistance was carried out on the test tires according to the test methods shown in Example 1, obtaining the results shown in Table 3.

TABLE 3

|  | Comparison Tire 5 | Present Invention Tire 7 | Present Invention Tire 8 | Present Invention Tire 9 | Comparison Tire 6 |
|---|---|---|---|---|---|
| Inclination Angle a (°) | 50 | 50 | 50 | 50 | 50 |
| Inclination Angle β (°) | 15 | 15 | 15 | 15 | 15 |
| Communicating Position of One Terminal End of Assistant Groove | 15% | 20% | 25% | 30% | 35% |
| Communicating Position of the Other Terminal End of Assistant Groove | 25% | 25% | 25% | 25% | 25% |
| Drainage Characteristics | 103 | 105 | 103 | 102 | 96 |
| Uneven Wear Resistance | 97 | 103 | 105 | 103 | 102 |

As can be seen from Table 3, the present invention tires in which one terminal ends of the assistant grooves communicate with the middle lateral grooves at positions ranging from 20% to 30% of the tire-widthwise lengths of the lateral grooves from the outer terminal ends of the middle lateral grooves can improve uneven wear resistance while maintaining drainage characteristics.

EXAMPLE 4

Prepared were test tires according to the present invention tires 10 to 12 and comparison tires 7 and 8, each having the same tire size and tread pattern as in Example 1, in which the inclination angles a and β of the first and second inclined groove portions of each middle lateral groove, the communicating position (from the outer terminal end of the one middle lateral groove) of one terminal end and communicating position (from the inner terminal end of the other middle lateral groove) of the other terminal end of each assistant groove communicating with the middle lateral grooves were as shown in Table 4. The test tires are the same in construction as in Example 1 except for the structures shown in Table 4.

Evaluation testing for drainage characteristics and uneven wear resistance was carried out on the test tires according to the test methods shown in Example 1, obtaining the results shown in Table 4.

TABLE 4

|  | Comparison Tire 7 | Present Invention Tire 10 | Present Invention Tire 11 | Present Invention Tire 12 | Comparison Tire 8 |
|---|---|---|---|---|---|
| Inclination Angle a (°) | 50 | 50 | 50 | 50 | 50 |
| Inclination Angle β (°) | 15 | 15 | 15 | 15 | 15 |
| Communicating Position of One Terminal End of Assistant Groove | 25% | 25% | 25% | 25% | 25% |
| Communicating Position of the Other Terminal End of Assistant Groove | 15% | 20% | 25% | 30% | 35% |
| Drainage Characteristics | 97 | 105 | 103 | 102 | 102 |
| Uneven Wear Resistance | 102 | 103 | 105 | 103 | 100 |

As can be seen from Table 4, the present invention tires in which the other terminal ends of the assistant grooves communicate with the middle lateral grooves at positions ranging from 20% to 30% of the tire-widthwise lengths of the lateral grooves from the inner terminal ends of the middle lateral grooves can improve uneven wear resistance while maintaining drainage characteristics.

INDUSTRIAL APPLICABILITY

The present invention having the aforementioned excellent effects is very effectively applicable to pneumatic tires to be mounted on passenger cars in particular.

What is claimed is:

1. A pneumatic tire having a tread surface having a center region, the tread surface comprising:
    a first circumferential groove extending in a circumferential direction of the tire in the center region;
    a second circumferential groove extending in the circumferential direction of the tire in the center region;
    a middle rib defined by the first circumferential groove and the second circumferential groove;
    middle lateral grooves obliquely extending in a widthwise direction of the tire and disposed at predetermined intervals in the circumferential direction of the tire in the middle rib, only one terminal end of each of the middle lateral grooves communicating with one circumferential groove of the first circumferential groove and second circumferential groove;
    an assistant groove provided between each of adjacent middle lateral grooves, the assistant groove extending in such an inclined manner that an inclination direction thereof with respect to the circumferential direction of the tire is opposite to that of the middle lateral grooves;
    a lateral narrow groove extending in the widthwise direction of the tire between each of the adjacent middle lateral grooves, the lateral narrow groove being smaller in width than the adjacent middle lateral grooves, the lateral narrow grooves and the middle lateral grooves being alternately disposed in the circumferential direction of the tire in the middle rib; and
    a block defined by the assistant groove, middle lateral grooves and one circumferential groove, wherein:
    the middle lateral grooves each include a first inclined groove portion communicating with the one circumferential groove and a second inclined groove portion connected to the first inclined groove portion, the first inclined groove portion having an inclination angle α ranging from 35 degrees to 60 degrees with respect to the circumferential direction of the tire, the second inclined groove portion having an inclination angle β ranging from 0 degree to 30 degrees with respect to the circumferential direction of the tire; and the assistant groove has opposing terminal ends that communicate with the adjacent middle lateral grooves, one terminal end of the opposing terminal ends of the assistant groove being located at a position ranging from 20% to 30% of a tire-widthwise length of one middle lateral groove of the adjacent middle lateral grooves from the one terminal end of the one middle lateral groove toward a side of the other terminal end of the one middle lateral groove in the widthwise direction of the tire, the other terminal end of the opposing terminal ends of the assistant groove being located at a position ranging from 20% to 30% of a tire-widthwise length of the other middle lateral groove of the adjacent middle lateral grooves from the other terminal end of the other middle lateral groove toward a side of the one terminal end of the other middle lateral groove in the widthwise direction of the tire.

2. A pneumatic tire according to claim 1, wherein each of the first inclined groove portion and the second inclined groove portion extends in a straight line.

3. A pneumatic tire according to claim 1, wherein each of the first inclined groove portion and the second inclined groove portion extends in a curved line such that each of the inclination angles α and β is gradually greater toward the one terminal end side of the middle lateral groove.

4. A pneumatic tire according to claim 1, wherein the assistant groove extends between the first inclined groove portion of the one middle lateral groove of the adjacent middle lateral grooves and the second inclined groove portion of the other middle lateral groove of the adjacent middle lateral grooves.

5. A pneumatic tire according to claim 1, wherein the first circumferential groove is provided at an equatorial plane of the tire in the tread surface, and the second circumferential groove is provided on each side of the first circumferential groove.

6. A pneumatic tire according to claim 5, wherein the second circumferential groove has a width that is one to three times greater than a width of the first circumferential groove.

7. A pneumatic tire according to claim 5, wherein a sum of widths of the circumferential grooves is 20% to 35% of a contact width of the tire.

8. A pneumatic tire according to claim 5, wherein the other terminal end of each middle lateral groove is away from the other circumferential groove of the first circumferential groove and second circumferential groove, a distance between the other circumferential groove and the other terminal end of each middle lateral groove away therefrom being 20% to 40% of a width of the other circumferential groove.

9. A pneumatic tire according to claim 5, wherein the one terminal end of each middle lateral groove communicates with the second circumferential groove.

10. A pneumatic tire according to claim 5, wherein the tread surface further comprises an outer rib formed tire-widthwisely outwardly of the second circumferential groove, outer lateral grooves being disposed at predetermined intervals in the circumferential direction of the tire in the outer rib, each of the outer lateral grooves extending tire-widthwisely outwardly from a position away from the second circumferential groove, each of the outer lateral grooves having a width of 20% to 60% of a width of the second circumferential groove.

11. A pneumatic tire according to claim 10, wherein a distance between the second circumferential groove and each of the outer lateral grooves away therefrom is 20% to 50% of the width of the second circumferential groove.

12. A pneumatic tire according to claim 10, wherein the tread surface further comprises a lateral narrow groove extending in the widthwise direction of the tire between each of the adjacent outer lateral grooves, the lateral narrow groove being smaller in width than the adjacent outer lateral grooves, the lateral narrow grooves and the outer lateral grooves being alternately disposed in the circumferential direction of the tire in the outer rib.

13. A pneumatic tire according to claim 1, wherein the first circumferential groove is provided on each side of an equatorial plane of the tire in the tread surface, and the second circumferential groove is provided on each side of the first circumferential grooves.

* * * * *